US011419315B2

(12) United States Patent
Schwager et al.

(10) Patent No.: US 11,419,315 B2
(45) Date of Patent: Aug. 23, 2022

(54) TABLETOP APPARATUS FOR FILLING AND SEALING DRINKING STRAWS WITH HONEY OR OTHER VISCOUS LIQUIDS USING CENTRIFUGAL FORCE

(71) Applicants: Tony A. Schwager, Lawrence, KS (US); Terri Lisa Schwager, Lawrence, KS (US)

(72) Inventors: Tony A. Schwager, Lawrence, KS (US); Terri Lisa Schwager, Lawrence, KS (US)

( * ) Notice: Subject to any disclaimer, the term of this patent is extended or adjusted under 35 U.S.C. 154(b) by 88 days.

(21) Appl. No.: 16/870,753

(22) Filed: May 8, 2020

(65) Prior Publication Data

US 2021/0321592 A1   Oct. 21, 2021

Related U.S. Application Data

(60) Provisional application No. 62/920,634, filed on May 10, 2019.

(51) Int. Cl.
*A01K 59/04* (2006.01)
*B65B 3/10* (2006.01)
*B65B 37/12* (2006.01)

(52) U.S. Cl.
CPC .............. *A01K 59/04* (2013.01); *B65B 3/10* (2013.01); *B65B 37/12* (2013.01)

(58) Field of Classification Search
None
See application file for complete search history.

(56) References Cited

U.S. PATENT DOCUMENTS

| 4,939,884 A * | 7/1990 | Peters ....................... B65B 3/16 |
| | | 141/144 |
| 8,925,289 B2 * | 1/2015 | Lecointe ............. B29C 66/1122 |
| | | 53/283 |

FOREIGN PATENT DOCUMENTS

DE      4400943 A1 *   7/1994   ........... A61D 19/024

* cited by examiner

*Primary Examiner* — Hemant Desai
*Assistant Examiner* — Tanzim Imam
(74) *Attorney, Agent, or Firm* — Law Office of Mark Brown, LLC; Mark E. Brown

(57) ABSTRACT

The Title of this invention is Tabletop Apparatus for Filling and Sealing Drinking Straws with Honey or Other Viscous Liquids Using Centrifugal Force. This is an apparatus for filling and sealing the ends of drinking straws (or other small round reservoirs) with viscous liquids such as honey, syrup, sauces, and oils. The filled straws will hold about 5 ml of liquid and can be used for samples or snacks. The apparatus is designed in such a manner that particles under 4 mm can also be included in the straws. Examples of such inclusions are poppy seeds, pollen grains, apple bits, sesame seeds, and other. The inclusions are generally edible items. Using a specially designed holder and an impulse sealer the straws are then sealed several at a time on one end only before being inserted into the apparatus. After filling, the second end is sealed using the same method.

1 Claim, 4 Drawing Sheets

TABLETOP APPARATUS FOR FILLING AND SEALING DRINKING STRAWS WITH HONEY OR OTHER VISCOUS LIQUIDS USING CENTRIFUGAL FORCE

CROSS-REFERENCE TO RELATED APPLICATION

This application claims priority in U.S. Provisional Patent Application No. 62/920,634, filed May 10, 2019, which is incorporated herein by reference.

SUMMARY OF THE INVENTION

This is an apparatus for filling and sealing the ends of drinking straws other small round reservoirs) with viscous liquids such as honey (primary use), syrup, sauces, oils, and others (see FIG. 1). The filled straws will hold about 5 ml of liquid and can be used for samples or snacks. The apparatus is designed in such a manner that particles under 4 mm can also be included in the straws. Examples of such inclusions are poppy seeds, pollen grains, apple bits, sesame seeds, and other. The inclusions are generally edible items. Using a specially designed holder (see FIG. 4) and an impulse sealer (or other suitable sealing device), the straws or tubes are sealed several at a time on one end only before being inserted into the apparatus. After (described later), the second end is sealed using the same method as the first end. Best results are achieved when the filled straws are placed vertically, open-end-up, into a container for a period of time (varies by time, temperature, and viscosity) adequate for the liquid to settle in the straw, leaving a small air gap at the top. This air gap helps to facilitate successful sealing of the second end.

The primary item intended to be produced using this apparatus is a honey straw. Honey straws are often referred to as honey sticks. They are basically a drinking straw filled with honey, used as a sweet treat or an energy snack. Many other types of straws or "sticks" can be created. All with the purpose of being eaten, sold, used as samples, or as a carrier for medications or supplements.

BRIEF DESCRIPTION OF THE DRAWINGS

The drawings constitute a part of this specification and include exemplary embodiments of the present invention illustration various objects and features thereof.

DETAILED DESCRIPTION OF THE PREFERRED EMBODIMENTS

Figure 1:
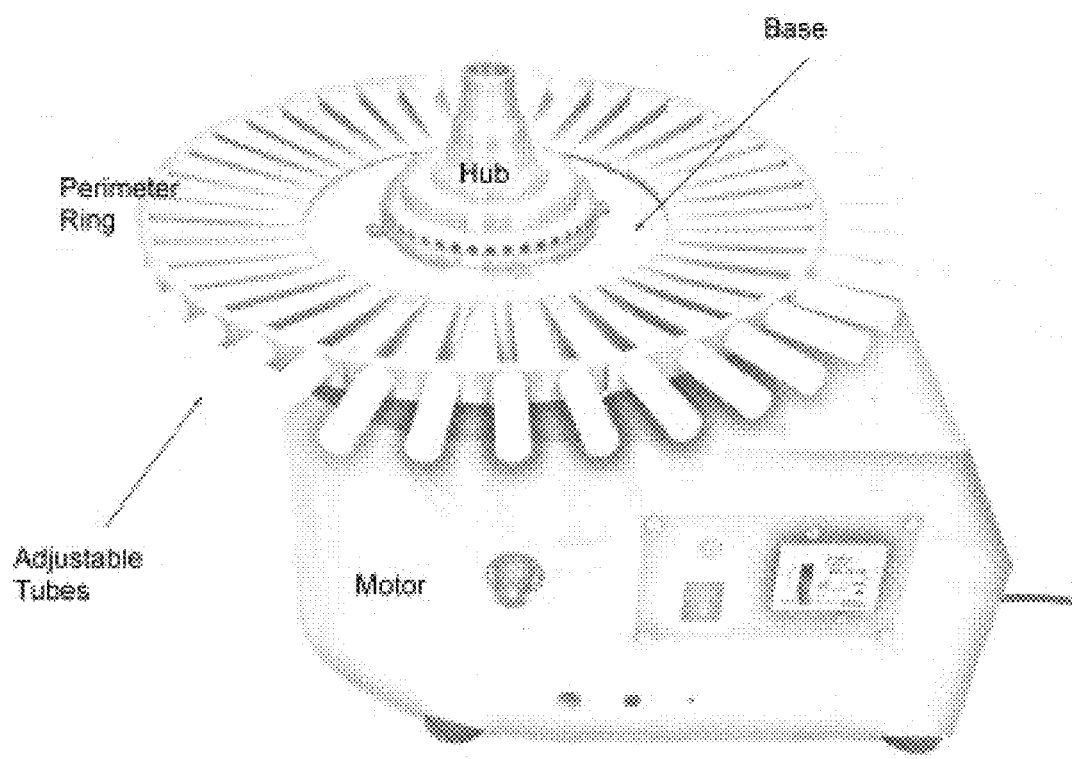
FIG. 1 shows a top, front, perspective view of a tabletop apparatus for filling tubular containers with viscous liquid embodying the present invention.
Figure 2:
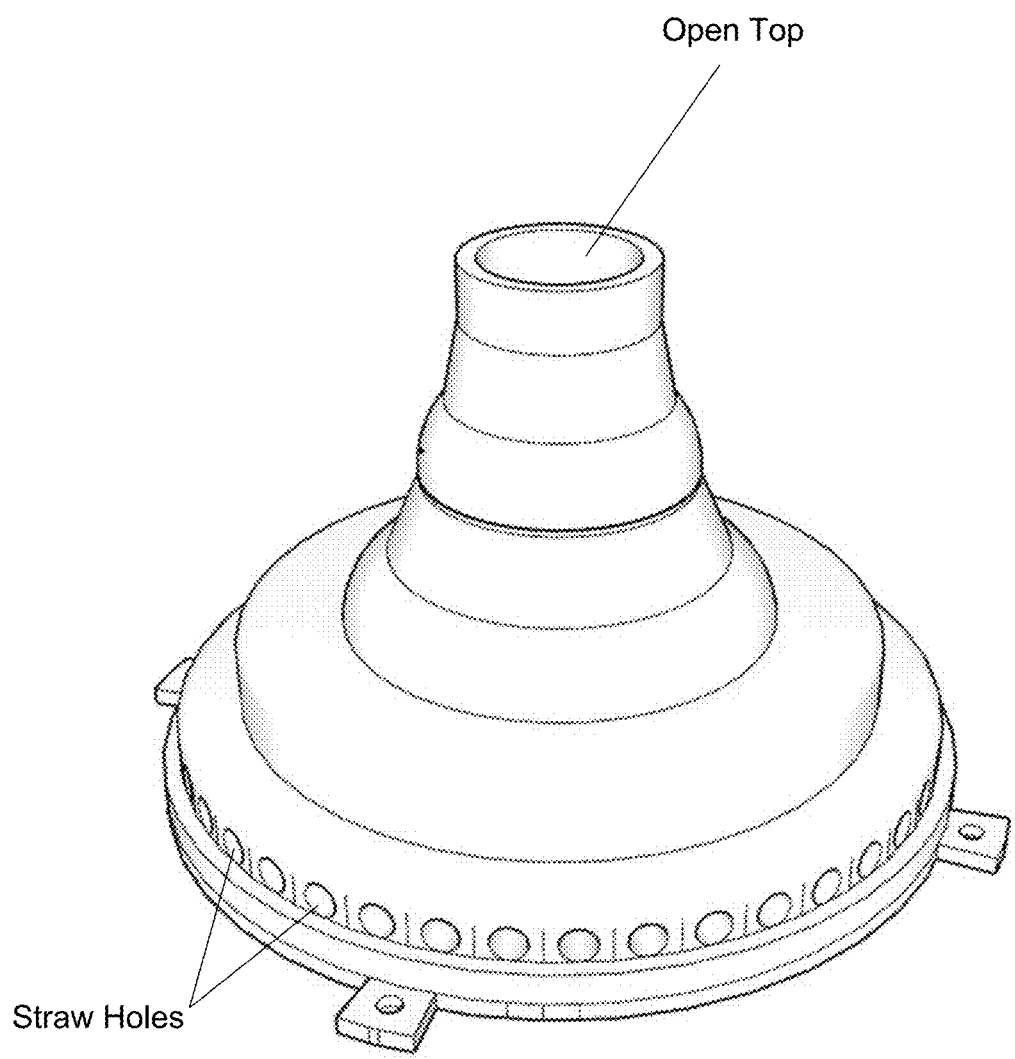
FIG. 2 shows a top, side, perspective view of a hub piece of the tabletop apparatus of the present invention.

The first key component of the apparatus is a center Hub that is 3D printed using food grade PLA filament, hereafter referred to as the Hub (see FIG. 2). The Hub can be injection molded in the future when warranted by production volume. There are currently two versions of the Hub. One is designed for use with plastic drinking straws. The other version of the Hub is designed with different measurements to accommodate straws made from bin-plastics.

The Hub is open on the top and has a reservoir designed to hold the amount of honey or viscous liquid required to fill 40 straws. The reservoir is sloped outward and downward from the top opening towards a series of holes that are precisely the same size as the outside diameter of the straw to be filled. There is also a slight slope upward and outward from the bottom of the reservoir towards the holes. The purpose and function of this sloped. configuration is to leverage the effects of the centrifugal force created while the apparatus is spinning; to force liquid into the holes, and subsequently into straws inserted into those holes. The Hub is centrally attached to a disc, which is driven by an electric motor in order to generate the centrifugal force necessary to move the honey or viscous liquid into the straws. The honey or viscous liquid moves into the straws because the force generated by the spinning motion is greater than the surface tension of the liquid against the walls of the straws. Methods other than an electric motor can be used to create the necessary spinning motion.

Figure 4:
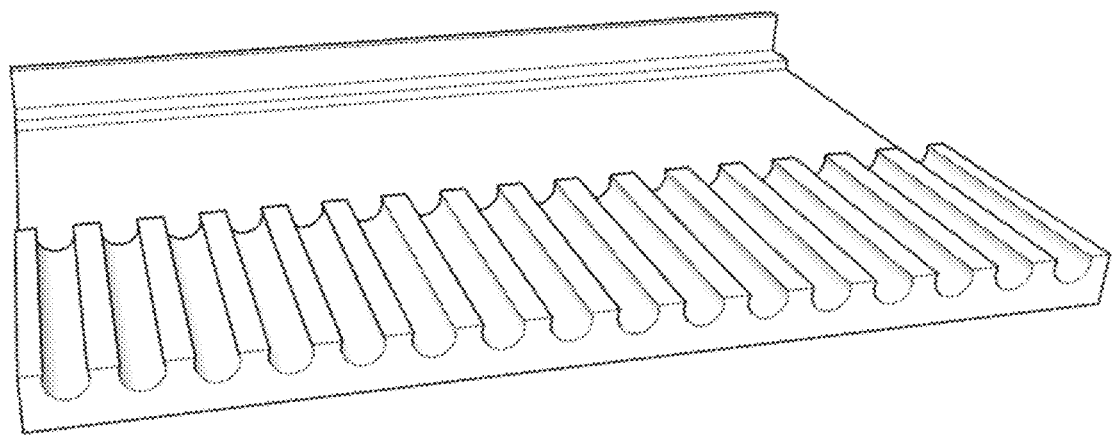
FIG. 4 shows a top, front, perspective view of a straw holder embodying an aspect of the present invention.

The straws are sealed on one end prior to being inserted into the Hub, using an electric impulse sealer. Centrifugal force, combined with the angled walls of the hub, solves the problem of overcoming air pressure within a sealed straw in order to fill it with liquid. Generally, such a sealed straw will not take on liquid due to a blockage created by the surface tension of the liquid or due to the closing of the entrance by whatever nozzle or device is being used to attempt to fill the straw. Without employing centrifugal force straws will not fill under the above circumstances. After filling, the sealed end creates a vacuum which prohibits the liquid from coming out. The honey or viscous liquid is held in the straw permanently by sealing the opposite end of the straw after filling. This is also done with the impulse sealer. In order to increase efficiency and speed, the apparatus includes a specially designed device (FIG. 4) to hold and align multiple straws at one time. This device is called the Straw Holder. The Straw Holder includes a stop that serves to make certain that the straws are inserted the correct distance into the sealer for uniformity.

Figure 3:
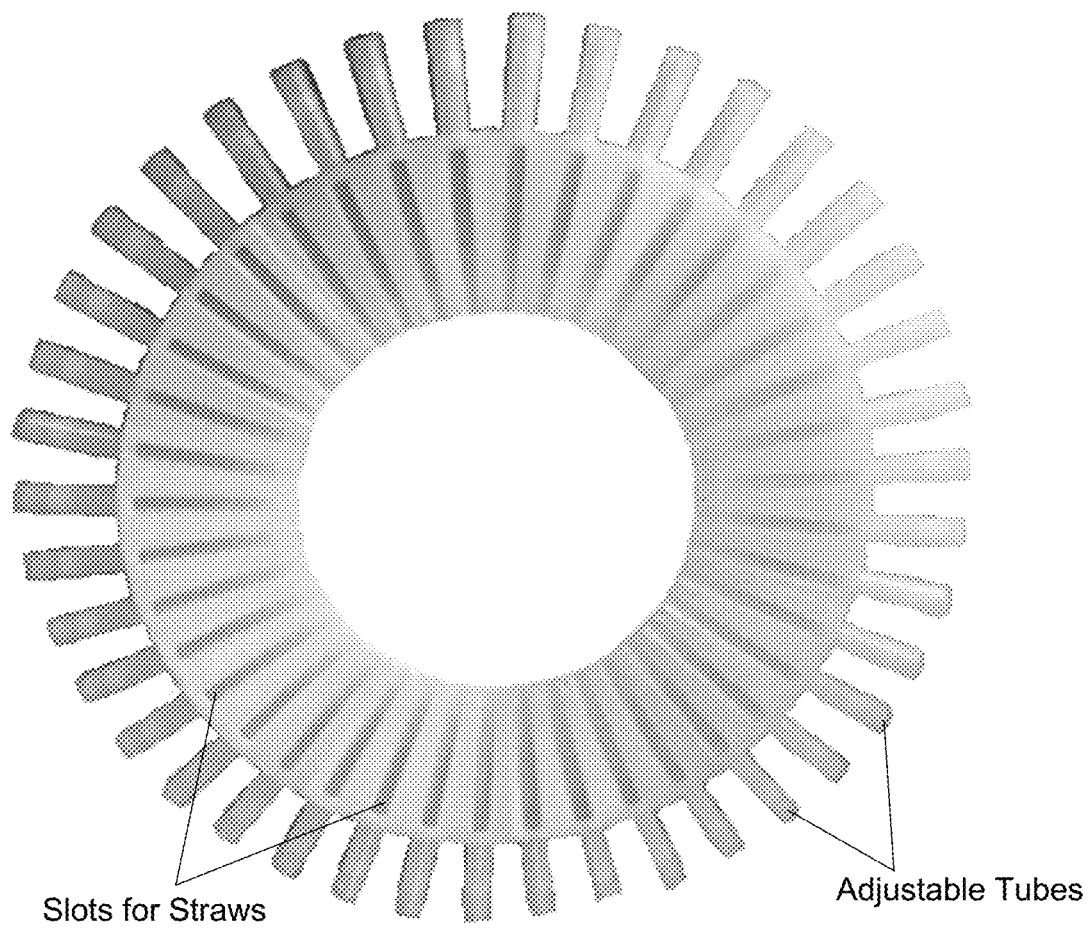
FIG. 3 shows a top, plan view of a perimeter ring piece of the tabletop apparatus of the present invention.

The second key component of the apparatus is a circular ring that forms the perimeter (see FIG. 3). This component will be called the Perimeter Ring. The Perimeter Ring has 40 equally spaced slots for the purpose of holding the straws while they are spinning. The extremity of each of the slots is a closed tube with an adjustable insert/stop. This is accomplished by repurposing an empty lip balm tube. This tube serves three purposes. The first purpose is to keep the straw securely in the apparatus while it is spinning. The second purpose is so that different length straws can be used by adjusting the insert/stop. The third purpose is for ease of cleaning, should any improperly sealed straws allow the honey or viscous liquid to leak out during spinning. This cleaning is accomplished by extending the insert/stop to its limit, thus forcing out any excess liquid.

The Hub and the Perimeter Ring are attached to a circular base, which is attached to an electric motor so that the entire assembly can be caused to spin. The spinning is what creates the centrifugal force needed to fill the straws with the honey or viscous liquid. Prior to spinning, the straws are inserted into the apparatus manually. Prior to this, one end of the straw is sealed using the Straw Holder and an electric impulse sealer. The sealed straws are inserted into the holes at the base of the hub. They are pushed in far enough so that the other (sealed end) clears the opening in the tube that extends from the perimeter ring. Then the straw is slid back (away from the hub) until it is fully inserted into the tube. At this point, the open end is flush with the opening of the hole inside of the hub. After all 40 straws are properly loaded into the Hub, the full amount of honey or viscous liquid is poured into the open top of the Hub. The apparatus is now switched on and begins to spin. It has a variable speed control. The top speed is generally best, except for liquids with very low viscosity. The duration of spinning will depend on the type of liquid and the temperature. If the correct amount of liquid has been poured into the Hub, then all straws will fill.

After the straws are filled, they are removed manually and the other end is sealed. The same method and equipment is used for this final step as for the first step. The "straw holder" (FIG. 3) is used. The straw holder is also 3D printed. It holds multiple straws in order to make sealing quicker and more time efficient. It consists of multiple grooves to hold the straws during sealing and a "wall" to make certain that all of the straws are lined up. Once lined up and secured into the holder, a standard impulse plastic bag sealer is used to seal the straws.

A search of the USPTO site did not reveal any similar inventions. There was one commercial machine, patent number U.S. Pat. No. 4,939,884A. It was designed to use a pump to fill the straws and a conveyor system to move straws into position to be filled and also to seal them, The apparatus described in this application is designed for small scale production and lower cost, The overall process is largely manual, which is completely different from the machine described in U.S. Pat. No. 4,939,884A, which is a high-velocity, commercial, automated machine.

The invention claimed is:

1. An apparatus for filling drinking straws with a viscous liquid using centrifugal force, the apparatus comprising:
   a center hub, wherein the viscous liquid is poured into an opening at a top of the hub and empty straws are inserted into precisely-sized holes near a base of the hub;
   a perimeter assembly radiating from the center hub and having slots to hold the straws in place, wherein centrifugal force, created by a spinning motion of the perimeter assembly, is used as an impetus for the viscous liquid to enter the straws; and
   adjustable tubes serving as a closure mechanism at an outer edge of each slot to hold the straws in place;
   wherein the apparatus is variable speed to accommodate various types of liquid at various temperatures and viscosities; and
   wherein the apparatus is capable of including small seeds into the straws as an addition to the viscous liquid.

\* \* \* \* \*